United States Patent [19]

White

[11] 4,199,037
[45] Apr. 22, 1980

[54] ELECTRIC AUTOMOBILE

[76] Inventor: Bruce D. White, 28615 Eagleton St., Agoura, Calif. 91301

[21] Appl. No.: 907,845

[22] Filed: May 19, 1978

[51] Int. Cl.² ............................................. B60L 11/12
[52] U.S. Cl. ............................... 180/65 C; 180/65 R; 180/65 D; 318/139
[58] Field of Search ............... 180/65 C, 65 R, 60, 180/65 F, 65 E; 318/139, 4, 5, 8

[56] References Cited

U.S. PATENT DOCUMENTS

| | | | |
|---|---|---|---|
| 786,376 | 4/1905 | Nilson | 180/65 C |
| 1,207,658 | 12/1916 | Swain | 180/65 R X |
| 1,790,634 | 1/1931 | Arendt | 180/65 C X |
| 3,190,387 | 6/1965 | Dow | 180/65 R |
| 3,454,122 | 7/1969 | Grady, Jr. | 180/65 R |
| 3,477,537 | 11/1969 | Plishner | 180/65 C |
| 3,497,027 | 2/1970 | Wild | 180/65 R |
| 3,621,929 | 11/1971 | Oberthur | 180/65 R |
| 3,690,397 | 9/1972 | Parker | 180/65 R |
| 3,837,419 | 9/1974 | Nakamura | 180/65 C |

Primary Examiner—Richard A. Bertsch
Assistant Examiner—Milton L. Smith
Attorney, Agent, or Firm—Fulwider, Patton, Rieber, Lee & Utecht

[57] ABSTRACT

An electrically-powered vehicle having a combination automobile frame and trailer, which are driven by a pair of electric motors located on the automobile frame. A battery is also located on the automobile frame, and a generator, along with a gas turbine for driving the generator, are located on the trailer. The vehicle can be operated with the trailer attached and the electric motors powered by a parallel combination of the battery and generator, or with the trailer removed and the motors powered by the battery alone. A controller turns on the gas turbine when the charge level in the battery drops below a first predetermined level and turns off the turbine when the charge level rises above a second predetermined level. Additionally, when the gas turbine is operating, its speed is maintained at a constant level, thereby maximizing its operating efficiency and yielding a minimum level of exhaust pollution.

6 Claims, 4 Drawing Figures

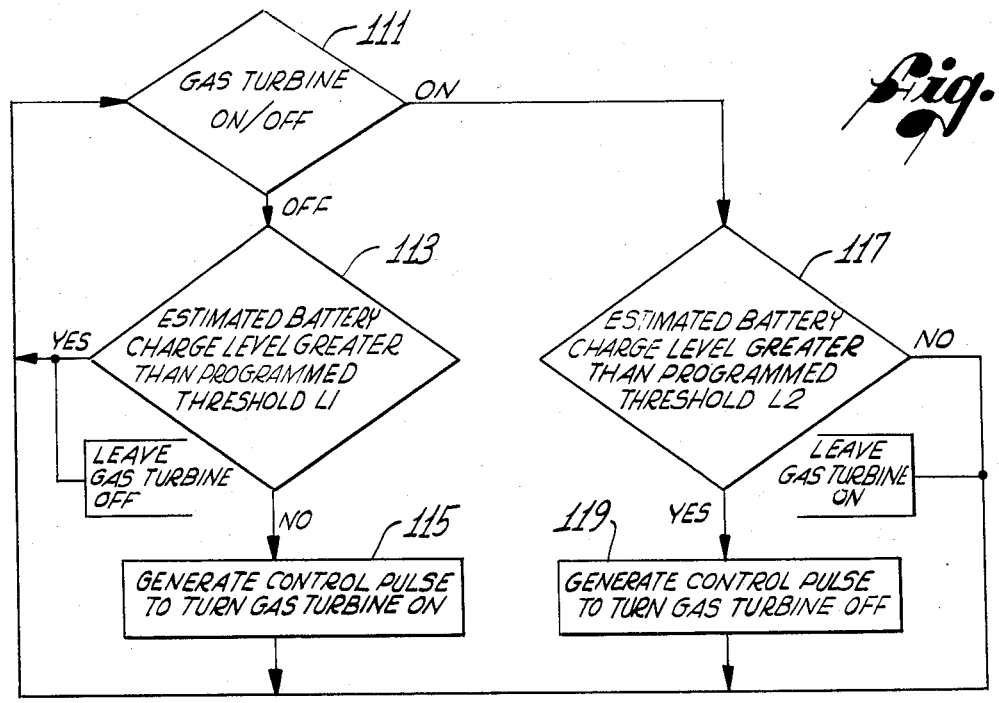
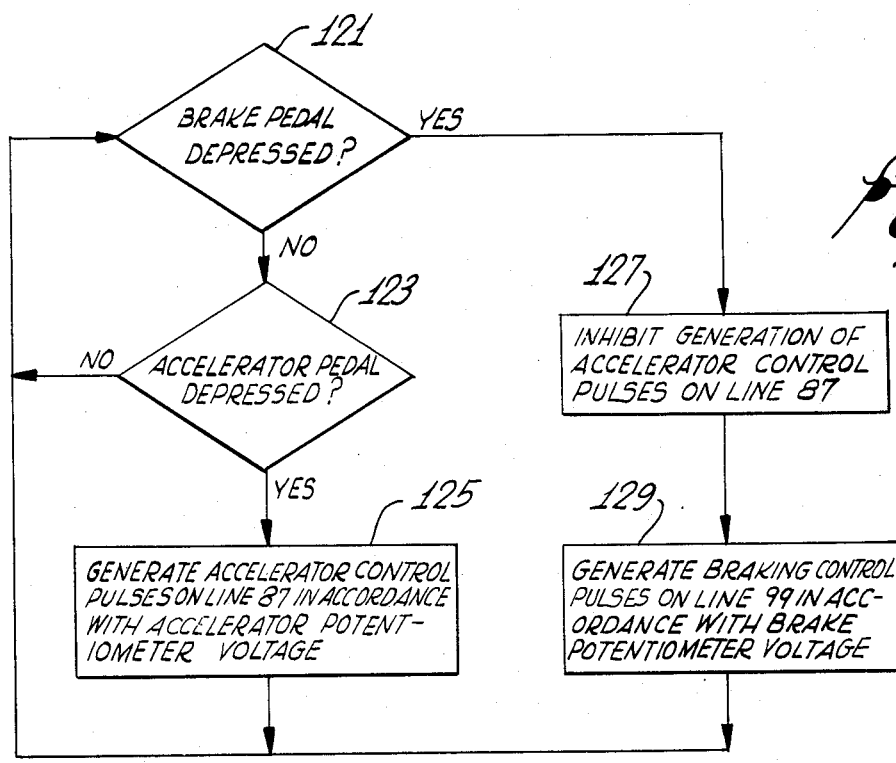

ELECTRIC AUTOMOBILE

BACKGROUND OF THE INVENTION

This invention relates generally to automotive vehicles, and more particularly, to electrically-powered automotive vehicles.

Electrically-powered automotive vehicles have long been known as viable alternatives to conventional gasoline-powered vehicles, especially in urban areas, where noise pollution and air pollution problems are acute. An electrically-powered vehicle of basic design, having an electric motor powered by a battery, has not provided completely satisfactory performance, however, because the battery must be recharged at frequent intervals, thereby limiting the range of the vehicle.

Improvements over this basic design are disclosed in U.S. Pat. No. 3,690,397, issued to L. W. Parker and entitled "Electric Automobile," and in references cited therein. The improvements suggested by Parker and others all utilize the same underlying concept, that the battery is carried on a separate wheeled trailer towed by the primary vehicle. When these towed battery units become discharged, they can be exchanged for charged battery units at special automotive service centers, where the units are maintained in a charged and properly serviced condition. Although this concept is useful in some situations, it fails to overcome the drawback that the battery units must be recharged or replaced at frequent intervals and additionally, suffers from the drawback that the vehicle can be operated only along routes where the special service centers are located.

Additional improvements to the basic electric vehicle design briefly described above are disclosed in U.S. Pat. No. 3,497,027, issued to A. F. Wild and entitled "Electric Automobile," and include a vehicle having an electric motor and removable power units or pods. In one of the embodiments disclosed in this patent, the vehicle carries two power pods, one having a battery, and the other having a gasoline engine and electrical generator. The battery power pod is ordinarily used when driving in urban areas, where limited range is not a particular problem and where air pollution and noise restrictions may exist, while the gasoline engine power pod is normally used elsewhere. Additionally, the gasoline engine power pod can be used to recharge the battery power pod.

The dual power pod concept disclosed in the Wild patent, although satisfactory in some situations, suffers from the drawback that special lifting equipment would be required for removal of the gasoline engine power pod. For this reason, the gasoline engine power pod would ordinarily be carried by the vehicle at all times, even on short trips through urban areas where the pod would not be used, thereby imposing an unecessary load on the vehicle and causing a wasteful consumption of battery power. This dual power pod concept suffers from the additional drawback that the gasoline engine power pod, when in use, is operated at variable speed, and hence at less than maximum efficiency, and at more than minimum levels of harmful exhaust pollutants.

It will be appreciated from the foregoing that there is still a need for an electrically-powered vehicle having an electric motor powered by both a battery unit and a gasoline engine/generator unit, that can travel substantial distances without the need for battery recharging, and that can be operated in such a manner so as to maximize fuel efficiency and minimize exhaust pollutant levels. The present invention fulfills this need.

SUMMARY OF THE INVENTION

The present invention resides in an improved electrically-powered vehicle having a direct-current electric motor powered alternatively by a battery or by an electric generator that is driven by a combustion engine. The current produced by the generator is utilized both to power the electric motor and to charge the battery. In accordance with the invention, the combustion engine operates at a constant speed, thereby maximizing its operating efficiency and maintaining a low level of harmful exhaust emissions. Additionally, the vehicle includes control means for operating of the combustion engine only when the energy stored in the battery drops below a predetermined level.

More particularly, an electrically-powered vehicle constructed in accordance with the present invention includes an automobile body and frame, which carries the electric motor and the battery, and a removable trailer, which carries the combustion engine and the generator, and which is towed by the automobile body and frame. The vehicle can be operated with the trailer member attached and the motor powered by the parallel combination of the battery and generator, or, alternatively, with the trailer member removed and the motor powered for limited distances by the battery alone.

The combustion engine of the present invention preferably takes the form of a gas turbine, which is transversely mounted on the trailer. A gas turbine is a durable and lightweight engine that produces a substantially vibrationless rotary output and that can operate satisfactorily on many different fuels, while producing relatively low emissions of harmful pollutants. Additionally, since the turbine operates at an optimum contant speed and, thus, develops a relatively high torque, the compressor portion of the turbine can be driven directly by the turbine shaft, whereby special apparatus for driving the compressor is not required.

In accordance with one aspect of the invention, electrical current from the parallel-connected battery and direct current generator, or from the battery alone, is supplied to the motor through a semiconductor switch that is controlled by a periodic control pulse signal produced by the control means. The duty cycle of this signal is varied in accordance with the position of an accelerator pedal, thereby varying the average value of the current supplied to the motor, and, thus, the speed of the motor.

In accordance with another aspect of the present invention, the direct current motor and the battery together can form a regenerative braking system to supplement a conventional mechanical braking system in reducing the speed of the vehicle. When a brake pedal is depressed, the semiconductor switch through which current to the motor is supplied is disabled, and the motor is then driven by the moving vehicle as a direct-current generator. Electrical current produced by this motor/generator is utilized to recharge the battery by transmitting it through a second semiconductor switch, which is controlled by a second periodic control pulse signal supplied by the control means. The duty cycle of this control pulse signal is varied in accordance with the position of the brake pedal, thereby varying the average value of the current supplied to the battery, and, thus, the rate of braking that is effected.

In an alternative embodiment of the present invention, the vehicle includes two direct-current motors, each driving a separate drive wheel. Compensation for differences in motor efficiencies can be accomplished by dynomometer testing of each motor/drive wheel combination and appropriate adjustment of the duty cycles of control pulse signals supplied by the control means separately to each motor. In this embodiment, the regenerative braking system includes means for automatically connecting the motors in series when the brake pedal is depressed. This increases the range of vehicles speeds over which the motors produce sufficient potential to charge the battery, and hence increases the effectiveness of the braking system.

Many other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

In the accompanying drawings:

FIG. 3 is a flowchart showing, in simplified form, the operational steps performed by a microprocessor in controlling operation of the gas turbine of the vehicle of FIG. 1; and FIG. 4 is a flowchart showing, in simplified form, the operational steps performed by a microprocessor in generating control pulse signals supplied to the semiconductor switches in the vehicle of FIG. 1.

DESCRIPTION OF THE PREFERRED EMBODIMENT

Figure 1:
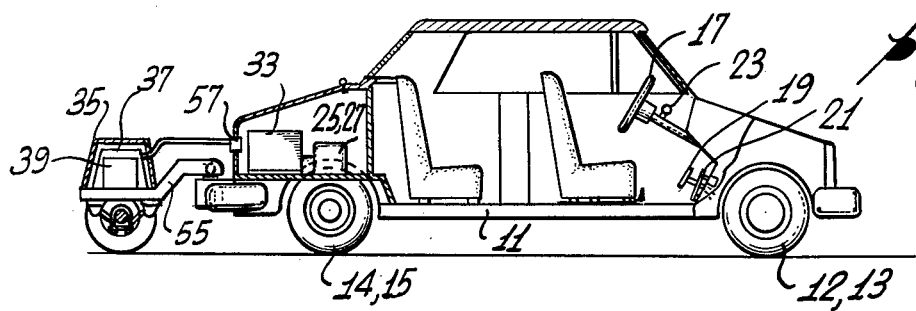
FIG. 1 is a simplified side elevational view of an electrically-driven vehicle embodying the present invention.
Figure 2:
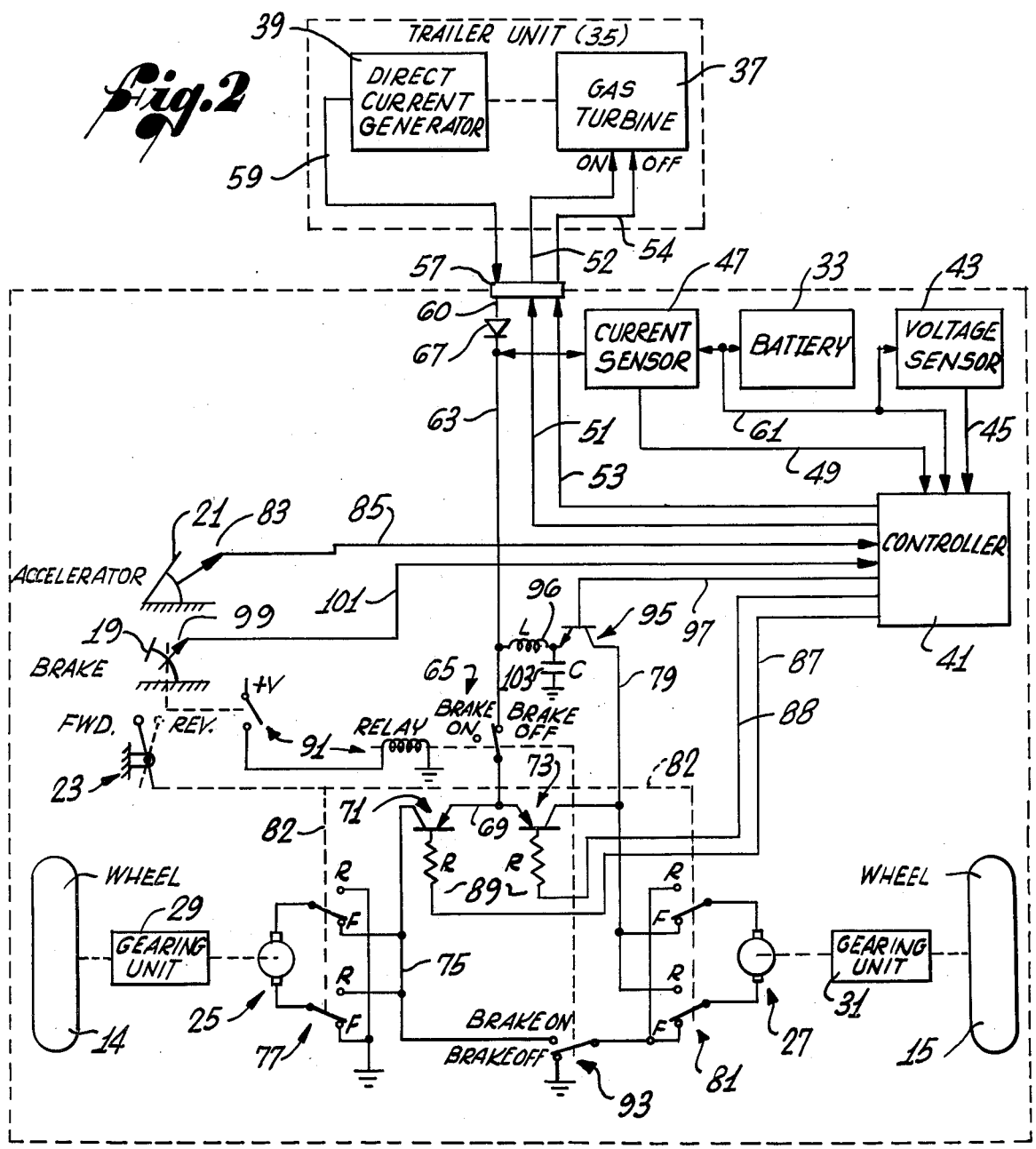
FIG. 2 is a simplified schematic diagram of the electrical drive system of the vehicle of FIG. 1.

Referring now to the drawings, and particularly to FIGS. 1 and 2 thereof, there is shown an electrical power system of an electrically-powered vehicle constructed in accordance with the present invention. The vehicle includes an automobile body and frame 11 supported on front wheels 12 and 13 and rear wheels 14 and 15, and utilizes standard steering and braking systems, including a steering wheel 17, a brake pedal 19, an accelerator pedal 21 and a forward/reverse control lever 23. Each of the rear wheels 14 and 15 is driven by a separate direct current electric motor 25 and 27 via suitable gearing units 29 and 31, respectively. An energy storage means in the form of a battery 33 is located on the automobile frame and is utilized to selectively drive the electric motors.

In accordance with the invention, the vehicle further includes a trailer unit 35 that carries a combustion engine in the form of a gas turbine 37, along with an associated direct-current electric generator 39 that is driven by the turbine. The electric generator is connected in parallel with the battery 33 and can be utilized both to drive the motors 25 and 27 and to charge the battery 33. It will be understood that an alternator and rectifier can be utilized as an alternative to the direct-current generator 39.

The vehicle further includes a controller 41 for controlling operation of the gas turbine 37. The controller turns the turbine ON whenever the amount of usable energy stored in the battery 33 drops below a first predetermined level, and turns the turbine OFF whenever the amount of usable stored energy rises above a second predetermined level.

In accordance with a further aspect of the invention, the vehicle includes means, such as a tachometer feedback fuel controller, operable when the gas turbine is operating, for maintaining the speed of the turbine at a constant level, thereby maximizing its efficiency and producing a minimum level of harmful exhaust pollutants. At its optimum speed, the gas turbine produces a substantially higher torque than do other combustion engines of comparable size and, additionally, produces substantially lower levels of harmful exhaust gases, especially carbon monoxide.

A conventional voltage sensor 43 continuously measures the voltage at the terminals of the battery 33 and transmits, over line 45 to the controller 41, an electrical signal that varies in accordance with the measured voltage. Similarly, a conventional current sensor 47 continuously measures the electric current being supplied to or from the battery 33, and transmits over line 49 to the controller an electrical signal that varies in accordance with the measured current. The controller 41, processes the instantaneous voltage and current signals and derives an estimate of the amount of usable energy stored in the battery. One measure of stored energy can be produced by utilizing these signals, along with the value of the internal resistance of the battery, in computing the unloaded or internal voltage of the battery.

When the estimate of usable stored energy drops below a predetermined level L1, the controller 41 produces a control pulse for transmission over line 51 to the gas turbine 37 for turning it ON. Similarly, when the estimate rises above a predetermined level L2, indicating that the battery 33 is fully charged, the controller produces a control pulse for transmission over line 53 to the gas turbine for turning it OFF. The vehicle can also include a manually operated control switch (not shown) for overriding the ON and OFF control signals supplied to the gas turbine 37, whereby the turbine can be operated whenever it is determined that additional power is required, as, for example, when the vehicle is travelling on a long upgrade.

It will be apparent that derivation of the estimate of usable energy stored in the battery 33, and the level comparisons and generation of the control pulse signals to turn the gas turbine 37 ON and OFF, can be readily performed utilizing hard-wired analog or digital circuitry. Alternatively, the operations can be readily performed using a conventional microprocessor. An example of a suitable program flowchart, showing, in simplified form, the functional steps performed by a microprocessor in generating the ON and OFF control pulses, is provided in FIG. 3.

At an initial step 111, it is determined whether the gas turbine is operating, i.e., "ON," or not operating, i.e., "OFF." If it is determined that the turbine is OFF, the next step 113 determines whether or not the estimated battery charge level is greater than the predetermined threshold level L1. Although not illustrated in FIG. 3, the microprocessor produces a measure of the estimated battery charge level by processing the battery voltage and current signals supplied on lines 45 and 49, respectively, along with the value of the internal resistance of the battery 33, to compute the unloaded or internal voltage of the battery.

If it is determined at step 113 that the estimated battery charge level is greater than the threshold L1, the gas turbine 37 is left OFF, and a return is made to step 111. If, on the other hand, it is determined at step 113 that the charge level is not greater than the threshold, a control pulse to turn the turbine ON is generated at step 115 and, in turn, a return is made to step 111.

If it is determined at step 111 that the gas turbine 37 is ON, the next step 117 determines whether or not the estimated battery charge level is greater than the predetermined threshold L2. If it is not greater, the gas turbine is left ON, and a return is made to step 111. If, on the other hand, the charge level is greater than the threshold, a control pulse to turn the turbine OFF is generated at step 119 and, in turn, a return is made to step 111.

The trailer unit 35, which carries the gas turbine 37 and the direct-current generator 39, is removably connected to the automobile frame 11 by a conventional trailer hitch 55. This permits the vehicle to be readily adapted for use on short trips, with the trailer removed and the motors 25 and 27 operating on current supplied by the battery 33 alone, and for use on long trips, with the trailer attached and the motors operating on current supplied by both the battery 33 and the direct-current generator 39.

A conventional rapid connect/disconnect electrical connector 57 is utilized to connect a cable 59, which carries current produced by the generator 39 to a corresponding line 60 located on the automobile frame, and to connect lines 51 and 53, which carry the ON and OFF control pulse signals, from the controller 41 to corresponding cables 52 and 54, respectively, attached to the gas turbine 37. The connector terminal on the automobile frame is also adapted for selectable connection to a conventional battery charger (not shown), to permit charging of the battery 33 when the vehicle is being garaged.

Electrical current from either the parallel combination of the direct-current generator 39 and the battery 33, or the battery alone is utilized to drive the first and second motors 25 and 27 and, thereby, to propel the vehicle. Current from the battery 33 is transmitted over line 61 to the current sensor 47 and, from there, over line 63 to a first relay switch 65, and current from the generator 39 is transmitted over cable 59 to the connector 57 located on the automotive frame 11 and, in turn, through a diode 67, which prevents current from being transmitted in the opposite direction, toward the generator, and over line 63 to the relay switch 65. The relay switch 65 is normally closed and is opened only when the brake pedal 19 is actuated.

Following transmission through the relay switch 65, the motor current is transmitted over line 69 to the emitter terminals of two PNP switching transistors 71 and 73, by means of which the current is divided and supplied over separate paths to the two motors 25 and 27. One portion of the current is transmitted over line 75 from the collector terminal of transistor 71 to a first forward/reverse switch 77 and, in turn, to the first motor 25. Similarly, a second portion of the current is transmitted over line 79 from the collector terminal of the other transistor 73 to a second forward/reverse switch 81 and, in turn, to the second motor 27. Each forward/reverse switch is a double-pole-double-throw switch that controls the polarity of the voltage applied to the corresponding motor. The switches 77 and 81 are controlled together by the position of the manually actuated forward/reverse control lever 23, as indicated by the broken line 82.

It will be understood by those of ordinary skill in the art that connection of field windings for the electric motors 25 and 27 can be made in a number of ways. One suitable method, which includes cross-connected field coils for automatically compensating for any unbalanced loading of the motors, is disclosed in the aforementioned Wild patent.

The speed of the motors 25 and 27 is controlled by a periodic pulsing ON and OFF of the two switching transistors 71 and 73. The accelerator pedal 21 is equipped with a conventional potentiometer, indicated diagrammatically at 83, which produces an accelerator voltage signal that varies linearly with the distance the pedal is depressed. This voltage signal is transmitted over line 85 to the controller 41, which produces separate periodic accelerator control pulse signals for transmission over lines 87 and 88, through separate resistors 89, and thence to the respective base terminals of the transistors 71 and 73.

The duty cycles of the respective accelerator control pulse signals supplied on lines 87 and 88 from the controller 41 are varied in accordance with the accelerator voltage signal, with maximum duty cycles occurring when the accelerator pedal 21 is fully depressed. Suitable frequencies for the control pulse signals are on the order of 100 Hz. It will be appreciated that by varying the percentage of time in which current is supplied to the armatures of the motors, the motor speed, and hence the vehicle speed, can be varied accordingly. Compensation for differences in the efficiencies of the motors 25 and 27 can be accomplished by testing each motor/drive wheel combination on a dynomometer and adapting the controller to appropriately adjust the duty cycles of the respective accelerator control pulse signals, to balance the torques that are produced.

Vehicle braking is effected both by conventional mechanical or hydraulic brakes (not shown), and by an electrical regenerative braking system that utilizes the motors 25 and 27 as direct-current generators. The regenerative braking system is operable when the vehicle is traveling at moderate to high speeds, at which time the motors will generate a relatively high voltage when no longer supplied with power.

Actuation of the brake pedal 19 actuates both the conventional mechanical brakes and the electrical regenerative braking system. Initial actuation of the pedal closes a limit switch 91 associated with the brake pedal, thereby opening the first relay switch 65 and interrupting the supply of current to the motors 25 and 27. Simultaneously, a second relay switch 93 is automatically closed, to connect the motors in a series arrangement and effectively double the voltage generated in the motors as they are driven by the wheels 14 and 15.

The voltage generated by the series-connected motors 25 and 27 is utilized to charge the battery 33, and thus to produce a braking torque for slowing the vehicle. Electrical current from the series-connected motors is transmitted over line 79 to the collector terminal of an NPN switching transistor 95, and thence from the emitter terminal of the transistor through an inductor 96 and over line 63 to the current sensor 47 and, in turn, over line 61 to the battery. The inductor limits the voltage applied to the battery and, additionally, provides current-limiting protection for the transistor 95.

The magnitude of the braking torque is controlled by a braking control pulse signal, which is transmitted over line 97 from the controller 41 to the base terminal of the NPN transistor 95, and which turns the transistor ON and OFF in a periodic fashion. Associated with the brake pedal 19 is a potentiometer, indicated diagramatically at 99, which produces a braking voltage signal that varies linearly with the location of the pedal. This voltage signal is supplied over line 101 to the controller 41, which, in turn, varies the duty cycle of the braking control pulse signal on line 97 accordingly. When the brake pedal is fully depressed, the duty cycle of the control signal is at a level that provides maximum vehicle braking, without causing tire skid. Suitable frequencies for the control pulse signal are on the order of 100 Hz.

The controller 41 includes a dc—dc voltage converter, whereby sufficient voltage to forward bias the base-emitter junction of the transistor 95 is produced. Additionally, a capacitor 103 is connected between the emitter of the transistor 95 and ground, whereby electrical current produced by the inductor 96 each time the transistor is turned off will be suitably channeled away from the transistor.

The vehicle can further include means (not shown) for preventing over-charging of the battery 33 by either the direct-current generator 39 or the regenerative braking system. Additionally, it is desirable that the gas turbine 37 be turned OFF before the battery 33 becomes fully charged, whereby the charging current produced by the regenerative braking system can be properly utilized by the battery.

When the voltage produced by the series-connected motors 25 and 27 drops below the voltage level of the battery 33, current can no longer be produced to charge the battery, but the vehicle will continue to be slowed by the mechanical braking system alone. The diode 67, which is included in the line between the battery 33 and the direct-current generator 39, precludes battery charging current produced by the regenerative braking system from being supplied to the generator.

It will be understood by those of ordinary skill in the art that the controller 41 can be implemented using known hard-wired digital and analog circuit techniques or, alternatively, using a microprocessor. An example of a suitable program flowchart, showing, in simplified form, the functional steps that are performed to produce the accelerator and braking control pulse signals, is provided in FIG. 4. It will also be apparent that the portion of the controller 41 that produces the accelerator and braking control pulse signals, shown in FIG. 4, and the portion of the controller that controls operation of the gas turbine 37, shown in FIG. 3, can alternatively be implemented using separate microprocessors.

Referring to FIG. 4, it is determined at an initial step 121 whether or not the brake pedal 19 is depressed. If the brake pedal is not depressed, the next step 123 determines whether or not the accelerator pedal is depressed. If the accelerator pedal is not depressed, a return is made to step 121, while on the other hand, if the accelerator is depressed, appropriate accelerator control pulses are produced at step 125 for output on lines 87 and 88, and, in turn, a return is made to step 121. The duty cycle of the accelerator control pulses is made to vary linearly with the accelerator voltage signal supplied on line 85 from the accelerator pedal potentiometer 83.

If it is determined at step 121 that the brake pedal 19 is depressed, generation of accelerator control pulses for output on line 87 is inhibited at step 127. Additionally, appropriate braking control pulses are produced at step 129 for output on line 97, and, in turn, a return is made to step 121. The duty cycle of the braking control pulses is made to vary linearly with the braking voltage signal supplied on line 101 from the brake pedal potentiometer 99.

From the foregoing, it should be apparent that the present invention provides a new and improved electrically-powered vehicle having both a battery and a combustion engine/generator, which can travel substantial distances without the need for battery recharging and which can operate in a highly efficient manner, with a minimum of exhaust pollution.

While a specific form of the invention has been illustrated and described, it should be apparent that various modifications and variations can be made without departing from the spirit and scope of the invention. Accordingly, it is not intended that the invention be limited, except as by the appended claims.

I claim:

1. An electrically-driven vehicle comprising:
   an automobile frame supported on a plurality of wheels;
   first and second direct-current electric motors mounted on said automobile frame, each of said motors adapted to drive a separate wheel;
   a battery mounted on said automobile frame, for storing electrical energy that can be utilized to drive said first and second electric motors;
   a trailer member adapted to be removably connected to said automobile frame;
   a direct-current electric generator mounted on said trailer member for producing electrical current that can be utilized to drive said and second electric motors, and, simultaneously, to charge said battery;
   a gas turbine mounted on said trailer member for driving said electric generator;
   sensor means for producing a measure of the amount of usable electric energy being stored in said battery;
   means for controlling operation of said gas turbine, including
      means for turning on said gas turbine when the measure produced by said sensor means is less than a first predetermined level,
      means for turning off said gas turbine when the measure produced by said sensor means is greater than a second predetermined level, and
      means operable when said gas turbine is operating, for maintaining the speed of the turbine at a constant level, thereby maximizing the efficiency of the turbine;
   means for controlling the speed of the vehicle, including
      an accelerator pedal,
      means for producing a first periodic control signal having a duty cycle that varies in accordance with the position of said accelerator pedal, and
      first semiconductor switch means responsive to the first periodic control signal for transmitting electric current produced by said battery or said electric generator to said first and second electric motors; and
   regenerative braking means utilizing said first and second electric motors as generators, for controllably slowing the vehicle, including
      a brake pedal, means for producing a second periodic electrical control signal having a duty cycle that varies in accordance with the position of said brake pedal, means operable when said brake pedal is actuated, for inhibiting the transmission of electrical current from said battery or said electric generator to said first and second electric motors, means operable when said brake pedal is actuated, for connecting said first and second electric motors in a series arrangement, and second semiconductor switch means responsive to the second periodic control signal for utilizing electric current produced by said first and second electric motors to charge said battery.

2. An electrically-driven vehicle comprising:

an automobile frame having first and second drive wheels mounted thereon;

first and second electric motors coupled to said first and second drive wheels, respectively;

a battery for storing electrical energy that can be utilized to drive said first and second electric motors; and speed control means for controllably coupling the electrical energy stored in said battery to said first and second electric motors, said speed control means including an accelerator pedal, first coupling means for controllably coupling electrical energy from said battery to said first electric motor in accordance with the position of said accelerator pedal, and second coupling means for controllably coupling electrical energy from said battery to said second electric motor in accordance with the position of said accelerator pedal, wherein the amount of electrical energy coupled by each of said first and second coupling means is controllably adjusted to compensate for any variations in the relative efficiencies of said first and second motors, such that the respective torques produced by said first and second drive wheels are substantially equal.

3. An electrically-driven vehicle as defined in claim 2, wherein:

said first coupling means includes means for producing a first periodic control pulse signal having a duty cycle that varies in accordance with the position of said accelerator pedal, and first switch means responsive to the first periodic control pulse signal for transmitting electrical energy from said battery to said first electric motor, accordingly; said second coupling means includes means for producing a second periodic control pulse signal having a duty cycle that varies in accordance with the position of said accelerator pedal, and second switch means responsive to the second periodic control pulse signal for transmitting electrical energy from said battery to said second electric motor, accordingly; and the relative duty cycles of said first and second periodic control pulse signals are controllably adjusted to compensate for any variations in the relative efficiencies of said first and second electric motors, such that the respective torques produced by said first and second drive wheels are substantially equal.

4. A regenerative braking system for use in an electrically-driven vehicle of the type having a frame, first and second electric motors mounted on the frame and adapted to be driven in parallel to propel the vehicle, and energy storage means mounted on the frame for storing energy that can be utilized to drive the motors, said braking system comprising:

a brake pedal mounted on the vehicle frame;

means for producing a periodic control pulse signal having a duty cycle that varies in accordance with the position of said brake pedal;

means for connecting said first and second electric motors in a series arrangement whenever said brake pedal is depressed, said series-connected electric motors functioning as an electric generator that can be utilized to controllably charge said energy storage means, thereby controllably braking the vehicle; and switch means responsive to the periodic control pulse signal for correspondingly coupling said series-connected electric motors to said energy storage means;

wherein the degree of vehicle braking effected by said regenerative braking system is proportional to the duty cycle of the periodic control pulse signal.

5. A regenerative braking system as defined in claim 4, further including inductor means coupled between said series-connected electric motors and said energy storage means, for limiting the voltage applied to said energy storage means and thereby preventing possible damage thereto.

6. An electrically-driven vehicle comprising:

an automobile frame supported on a plurality of wheels;

first and second direct-current electric motors, each of said motors adapted to drive a separate wheel;

a battery for storing electrical energy that can be utilized to drive said first and second electric motors;

speed control means for controllably powering said first and second electric motors, including an accelerator pedal, means for producing a first periodic control pulse signal having a duty cycle that varies in accordance with the position of said accelerator pedal, and first switch means responsive to the first periodic control pulse signal for transmitting electric current produced by said battery to said first and second electric motors, accordingly; and regenerative braking means utilizing said first and second electric motors as generators, for controllably braking the vehicle, including a brake pedal, means for producing a second periodic control pulse signal having a duty cycle that varies in accordance with the position of said brake pedal, means operable when said brake pedal is actuated, for inhibiting the transmission of electrical current from said battery to said first and second electric motors, means operable when said brake pedal is actuated, for connecting said first and second electric motors in a series arrangement, and second switch means responsive to the second periodic control pulse signal for utilizing electric current produced by said first and second electric motors to charge said battery, accordingly.

* * * * *